G. V. PAYNE.
METHOD OF LOCATING LEAKS IN UNDERGROUND PIPES.
APPLICATION FILED AUG. 8, 1917.
1,358,778.
Patented Nov. 16, 1920.
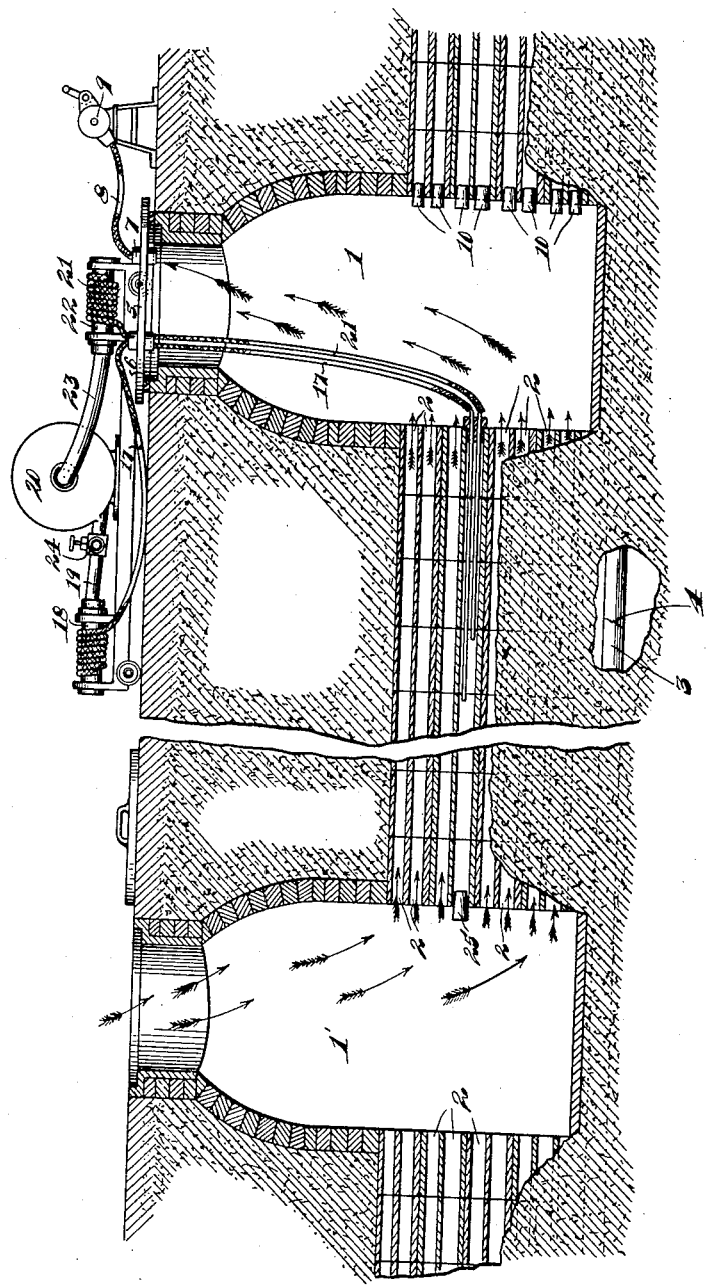
Witnesses:
C. E. Wessels.
Hazel R. Cohen.
Inventor:
George V. Payne
By Joshua R. H. Potts
his Attorney.

UNITED STATES PATENT OFFICE.

GEORGE V. PAYNE, OF CHICAGO, ILLINOIS.

METHOD OF LOCATING LEAKS IN UNDERGROUND PIPES.

1,358,778.  Specification of Letters Patent.  Patented Nov. 16, 1920.

Original application filed February 23, 1917, Serial No. 150,544. Divided and this application filed August 8, 1917. Serial No. 185,020.

*To all whom it may concern:*

Be it known that I, GEORGE V. PAYNE, a citizen of the United States, and a resident of the city of Chicago, county of Cook, and State of Illinois, have invented certain new and useful Improvements in Methods of Locating Leaks in Underground Pipes, of which the following is a specification.

My invention relates to improvements in methods of locating leaks in underground pipes, such as the conventional underground gas pipe, and has for its object the production of a method and apparatus whereby the location of a leak in a pipe of the character mentioned may be ascertained with comparative ease and expedition, the present application constituting a division of my prior application filed February 23, 1917, Serial No. 150,544. Other objects will appear hereinafter.

With these objects in view, my invention consists in the combinations and arrangements of parts hereinafter described and claimed.

The invention will be best understood by reference to the accompanying drawings forming a part of this specification, and in which, Figure 1 is a fragmentary sectional view through a section of ground, exposing the underground vaults, conduits and fluid pressure pipe and illustrating the employment of a method and apparatus embodying my invention, and Fig. 2, a detail view of means for permitting tests employed in the apparatus.

Referring to the drawing, I have illustrated two vaults or manholes 1 and 1' which are embedded or sunk in the ground and constructed in the usual manner. Extending between the vaults 1 and 1' are conduits 2 which ordinarily serve to accommodate the electric, telegraph or other wires which are buried below the surface of the ground, said conduits being formed, as is usual, of a plurality of alining sections, the joints between adjacent sections of said conduits being left not tightly closed so that gases or fluids in the ground in the vicinity may enter through said joints into the interiors of said conduits. Arranged adjacent the conduits 2 is a fluid pressure pipe 3, such as an ordinary gas pipe through which is conveyed illuminating gas. In the pipe 3 is shown the rupture or leak 4 which it is desired to locate in order that the leak or rupture may be stopped or repaired. The construction set forth is old and well known, the same being used at the present time in most cities or towns of considerable size.

In the practice of my invention, it is first determined between which two vaults the leak in the fluid pressure pipe has occurred, this being readily ascertained through the sense of smell, since upon a leak occurring in the fluid pipe, the fluid will permeate the soil in the vicinity and find its way to the conduits whence it will pass to and be discharged into the adjacent vaults. This being so, by removing the closures of said vaults, the presence of a strong odor will indicate that a leak has occurred adjacent thereto. After determining that the leak in the pipe 3 is located somewhere between the vaults 1 and 1', the covers of the latter are removed, and the upper end of the vault 1 closed by a transparent closure 5, preferably of glass, the transparent closure 5 being used so as to permit of the passage of light in order to illuminate the vault for operation therein. A felt packing or gasket 6 is preferably interposed between the upper edge of the vault and the under side of the closure 5 to insure a reasonably tight connection. The closure 5 is formed with an opening over which is arranged a nipple 7 for connection with a flexible hose 8 extending to a suitable manually operable blower 9, the arrangement being such that, when the blower 9 is operated, air will be withdrawn from the vault 1 to create a draft through the conduits 2 in the direction shown by the arrows. The upper end of vault 1' is left open in order to permit of ready entry of air drawn through the conduits 2. In the event of a wind blowing in the proper direction, the blower 9 may be dispensed with and the upper end of the vault left open, since a wind blowing in the proper direction will create a draft through the conduits 2 practically as effectually as that created by said blowing device.

The creation of a draft in the direction shown and mentioned through the conduits 2, draws the gas escaping from the leak 4 and entering said conduits outwardly through the vault 1, so that said conduits will contain only fresh or sweet air which has been drawn thereinto by the blower 9 or by reason of the draft created in said conduits.

In carrying on the method, two testing pipes 15 and 16 are employed, the pipe 15 being somewhat longer than the pipe 16. Pipe 15 is connected by means of a hose or tube 17 with a hollow shaft 18 of a hose reel arranged outside of the vault 1. The shaft 18 is connected by means of a pipe 19 with the discharge end of an ordinary centrifugal blower 20. Pipe 16 is connected by means of a hose 21 with the hollow shaft 22 of another hose reel connected by a pipe 23 with the intake of the blower 20. A discharge branch 24 governed by a three-way valve is provided for pipe 19.

In actual operation the pump or fan 9 is first operated to clear the vaults and conduits as far as possible from gas which has previously leaked thereinto. Then one end of the conduit 2 which it is desired to test is closed with a plug 25 and the operation of the fan 9 discontinued. The plugged conduit 2 is then tested by means of the pipes 15 and 16. In doing so, fan 20 is operated to force a draft of air from said fan outwardly through pipe 15 and back through pipe 16, as indicated by the arrows in Fig. 1. The pipes thus operated are adjusted to different longitudinal positions in the plug to conduits 2 and the draft from said pipes tested for each position. This test is readily made by throwing the valve to cause discharge of air through the branch 24 which may be tested by the sense of smell or otherwise. The pipes 15 and 16 are thus adjusted along through the conduits 2 until the odor of gas is noticed which will indicate the point at which the leak takes place.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The method of testing for leaks, which consists in providing a substantially inclosed draft exposed at one point; moving the exposed portion of said draft through the region of the anticipated leak; and testing the draft for the presence of leaking fluid, substantially as described.

2. The method of testing for leaks, which consists in providing a circuitous substantially inclosed draft exposed at one point; moving the exposed portion of said draft through the region of the anticipated leak; and testing the draft for the presence of leaking fluid, substantially as described.

3. The method of testing for leaks which consists in providing pipes open at adjoining ends and inducing a draft through said pipes; moving the adjoining ends of said pipes through the region of the anticipated leak; and testing the draft for the presence of leaking fluid, substantially as described.

4. The method of testing for leaks which consists in providing pipes of different lengths open at adjoining ends and inducing a draft through said pipes in opposite directions; moving the adjoining ends of said pipes through the region of the anticipated leak; and testing the draft for the presence of leaking fluid, substantially as described.

In testimony whereof I have signed my name to this specification in the presence of two subscribing witnesses.

GEORGE V. PAYNE.

Witnesses:
JOSHUA R. H. POTTS,
B. G. RICHARDS.